June 24, 1958 — R. H. SHAW — 2,840,338
BUTTERFLY VALVE
Filed April 10, 1953
Fig. 1
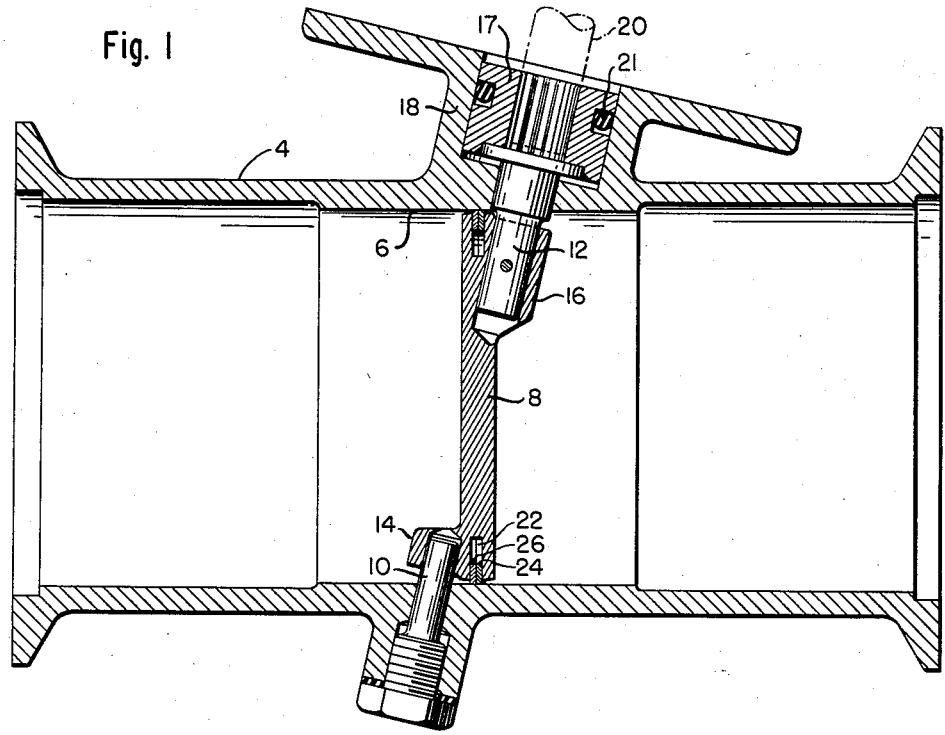
Fig. 2
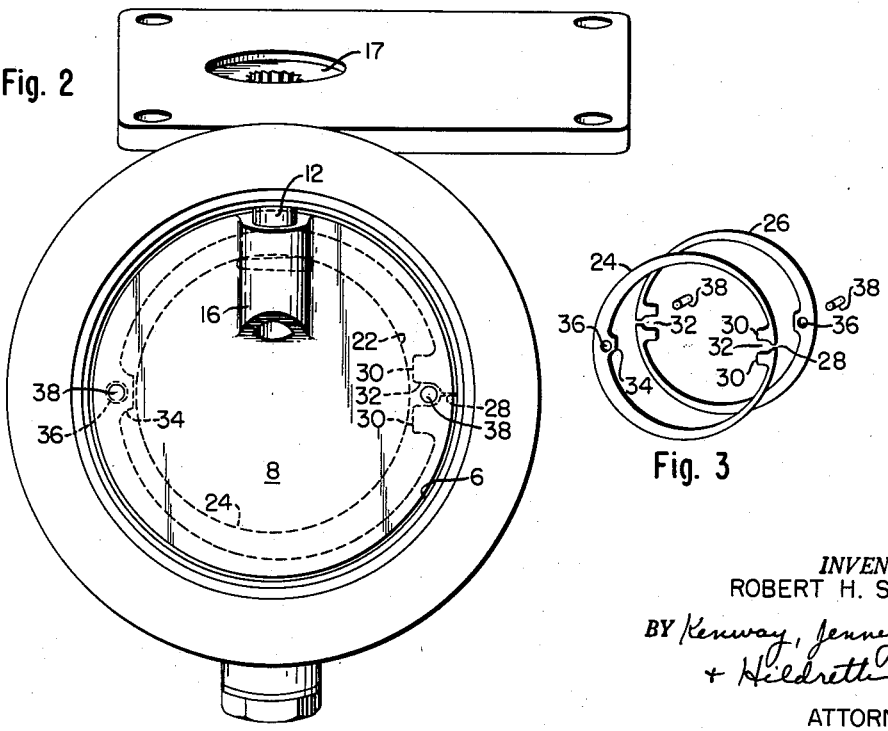
Fig. 3
INVENTOR.
ROBERT H. SHAW
BY Kenway, Jenney, Witter
& Hildreth
ATTORNEYS United States Patent Office 2,840,338
Patented June 24, 1958

2,840,338

BUTTERFLY VALVE

Robert H. Shaw, Concord, Mass., assignor to Standard-Thomson Corporation, Boston, Mass., a corporation of Delaware Application April 10, 1953, Serial No. 347,876

3 Claims. (Cl. 251—306)

The present invention relates to butterfly valves and more particularly to valves having sealing means for obtaining a fluid tight seal in closed position.

The object of the present invention is to provide improvements in butterfly valves and sealing means therefor whereby a smoothly actuated valve is obtained and a tight seal is effected in closed position.

In the accompanying drawings Fig. 1 is a longitudinal sectional elevation of the preferred form of butterfly valve.

Fig. 2 is an end elevation of the valve.

Fig. 3 is a detail illustrating the construction of the sealing means.

The valve according to the present invention comprises a longitudinal body 4 having a cylindrical seating section 6. The butterfly itself comprises a disk 8 pivotally mounted to turn within the section 6. As shown in Fig. 1 the preferred mounting comprises two studs 10 and 12 accurately opposed to each other across the section 6 and preferably at an angle less than 90° from the longitudinal axis of the section 6. As shown the disk 8, when in closed position, is normal to the longitudinal axis, but it may be angled with respect to the normal in which case the studs 10 and 12 may be on an axis perpendicular to the longitudinal axis; however, the construction shown in Fig. 1 is preferred for smoothness of operation.

The studs 10 and 12 are received in sockets 14 and 16 suitably formed in the disk member 8, the stud 12 being pinned or otherwise suitably secured to the member 8. The stud 12 is connected with a boss 17 received in a bearing member 18. The boss 17 is adapted to be connected with a suitable actuator indicated diagrammatically at 20. The bearing may be provided with any suitable packing, indicated as an O-ring 21.

The disk 8 is formed with a circumferential groove 22 within which are received side by side a plurality of sealing rings (preferably two rings) indicated at 24 and 26, which are similar in general arrangement to piston rings. As shown in Fig. 3 each ring is formed with a cut or slot 28 and with ears 30 on opposite sides of the slit to leave a loose pin receiving space 32. Opposite the cut 28 is an inwardly extending ear 34 having a pin receiving opening 36. As shown in Fig. 3 the annular width of the ring tapers from a maximum in the vicinity of the ear 34 toward a minimum in the neighborhood of the ears 30. The rings are sufficiently flexible to allow them to be expanded and inserted in the groove 22.

As shown in Fig. 3, the two rings are staggered diametrically, that is, the opening 36 of one ring is opposite the opening 32 of the other. Pins 38 are secured in the disk itself, each pin passing through the opening 36 of one ring and the space 32 of the other. It will be noted that the pin has a very loose fit in the space 32 and in fact does not ordinarily contact any part of the ring in the vicinity thereof. Preferably also there is some looseness of fit between the pin and the hole 36, at least sufficient to allow slight inward motion of the ring to accommodate itself to the walls of the sealing section 6.

By this construction, a smooth operating disk is obtained and a tight fit in the closed position is assured. The use of sealing rings for butterfly valves has been proposed, but has not been entirely successful for several reasons. First, there is a tendency to roll the rings out of the groove as the valve is turned, and second, the rings tend to rotate about their central axes and there is a distinct possibility of aligning the openings. By the present construction sufficient flexibility is afforded to permit ready insertion of the rings into the groove and the rings are secured against rolling out and also are prevented from any turning actions that may tend to align the opening. Nevertheless, the independent fit between the rings and the pins permits the rings to contract individually in such a manner as to effect a substantially tight closure against passage of fluid yet without any binding or chattering to interfere with valve operation.

The present invention is especially useful in handling of hot gases, as in aircraft cabin temperature controls, where a tight closure may be required in spite of rapid thermal changes, and where smooth and reliable operation is essential to permit actuation of automatic control mechanisms.

Having thus described my invention, I claim:

1. A butterfly valve having a cylindrical sealing section, a valve disk having a circumferential groove, two flat rings received in side-by-side relationship in the groove, each ring having a slot, inwardly-directed ears on both sides of said slot, and a single inwardly directed ear diametrically opposed to said slot and provided with a pin-receiving aperture, each ring tapering in width from a maximum near said single ear to a minimum near said slot, and a pair of pins each secured in the disk, engaging one of the rings in its aperture with a loose fit to accommodate contraction of the rings under normal operation and to prevent rotary motion thereof, and passing through the slot in the other ring between the ears on each side thereof.

2. A butterfly valve having a cylindrical sealing section, a valve disk having a circumferential groove, two flat rings received in side-by-side relationship in the groove, each ring having a slot and a pin receiving aperture, the rings being arranged with the slot of one adjacent the aperture of the other, and pins secured in the disk, each pin passing through the slot in one ring and engaging the other ring in its aperture with a loose fit to accommodate contraction of the rings under normal operation and to prevent rotary motion thereof.

3. A butterfly valve having a cylindrical sealing section, a valve disk having a circumferential groove, two flat rings received in side-by-side relationship in the groove, each ring having a slot and an inwardly-directed ear with a pin receiving aperture diametrically opposite said slot, the rings being arranged with the slot of one adjacent the aperture of the other, and pins each secured in the disk, passing through the slot in one ring and engaging the other ring in its aperture with a loose fit to accommodate contraction of the rings under normal operation and to prevent rotary motion thereof.

References Cited in the file of this patent

UNITED STATES PATENTS

| | | |
|---|---|---|
| 1,133,672 | Simons | Mar. 30, 1915 |
| 1,419,781 | Trippensee | June 13, 1922 |
| 1,645,146 | Kinsley | Oct. 11, 1927 |
| 2,058,996 | Kollberg | Oct. 27, 1936 |